Nov. 14, 1967  W. HOHN  3,352,603
COAL PLANER WITH HINGE-MOUNTED CUTTER HOLDER
Filed Feb. 2, 1965
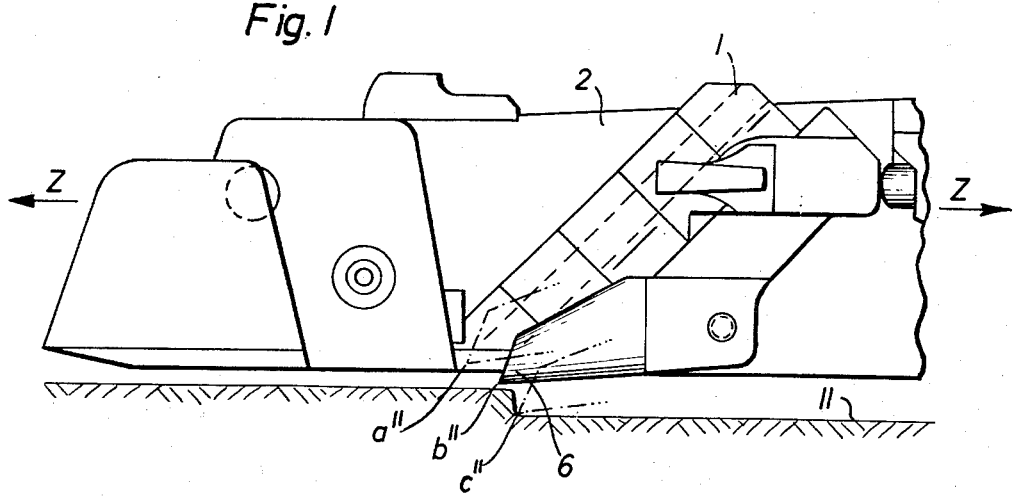
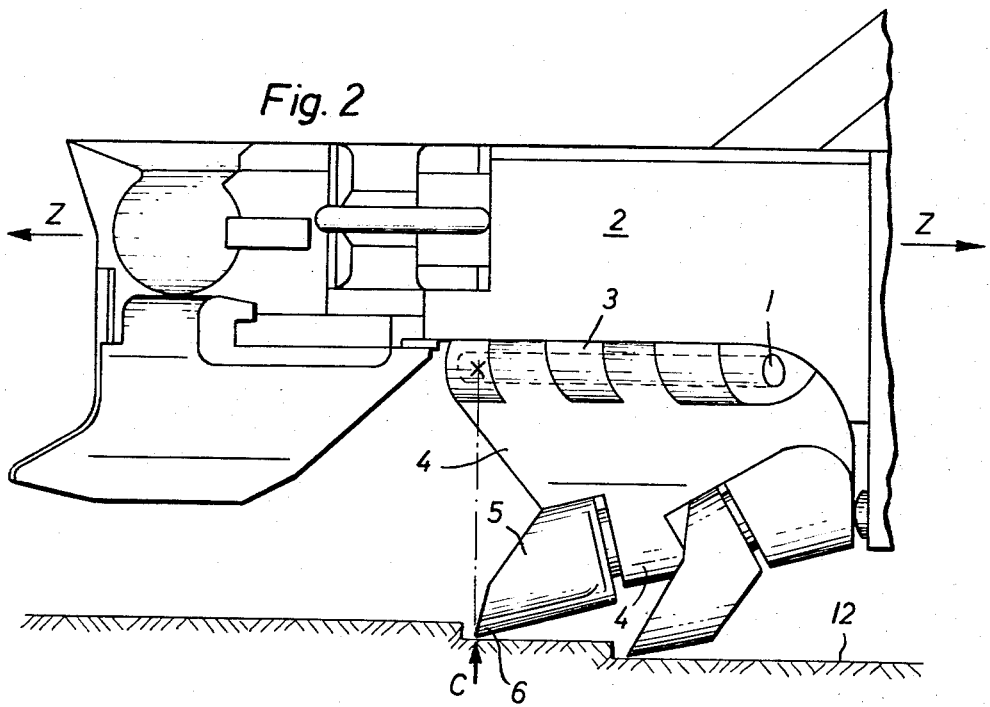
INVENTOR
WALTER HOHN
BY Burgess, Dinklage & Sprung
ATTORNEYS the device is not absolutely necessary that the floor 11 be horizontal and the face 12 be vertical.

United States Patent Office
3,352,603
Patented Nov. 14, 1967

3,352,603
COAL PLANER WITH HINGE-MOUNTED CUTTER HOLDER
Walter Hohn, Lunen, Westphalia, Germany, assignor to Gewerkschaft Eisenhutte Westfalia, a corporation of Germany
Filed Feb. 2, 1965, Ser. No. 429,832
Claims priority, application Germany, Feb. 7, 1964, G 39,788
2 Claims. (Cl. 299—34)

This invention relates in general to improvements in mining equipment, and more particularly to an improved coal planar of the hinge-mounted cutter holder type, such as is used for removing coal from a mining seam.

The basic coal planer to which the improvement according to the instant invention is directed ordinarily comprises a guide member positioned in front of the seam, a carriage member which is movable back and forth along the guide member in a direction parallel to the floor and face of the seam, a cutter holder which is pivotally connected to the carriage member, and one or more chisel-like cutters mounted to the cutter holder for removing coal from the floor and face of the seam as the carriage member is moved along the guide member.

In the operation of certain prior art coal planers of this type, difficulty was encountered in positioning the cutters so as to obtain a desired depth of cut along the seam floor, without also causing the cutters to dig deeper into the seam face.

This particular difficulty arose from a number of factors, including the geometry of the cutter mounting arrangement with respect to the pivot axis of the holder. In the typical prior art coal planer, the cutter holder was pivotally connected to the carriage by a hinge, with the pivot axis being in a plane substantially parallel to the face of the coal seam, and inclined at an angle of about 45 degrees to the seam floor, said floor and face of the seam being ordinarily horizontal and vertical respectively. The cutters, which included "tear-up" and/or "bottom" chisels, were mounted to the holder in such an arrangement that their leading cutting edges were located at positions forward of a plane normal to the coal seam face and passing through the hinge pivot axis. With such an arrangement, the cutting depths into both the seam floor and face were interdependent and were established by the angular position of the holder about its pivot axis. The angular position of the holder about the pivot axis was adjusted by conventional means such as spindles, jacks, levers, etc., so as to produce a given cutting engagement according to the prevailing conditions of the coal deposit to be mined. However, in such prior art coal planers, when the holder was pivoted to produce a greater depth of cutting penetration into the floor, the cutters were simultaneously positioned to cut deeper into the face, which was generally undesirable because the forces of reaction from the face were increased, and as a result of the forward position of the cutter leading edges, moments which tended to repel the cutters from the face were created.

This undesirable operating condition and the problems resulting therefrom are remedied by the improvement according to the instant invention wherein the cutters are mounted on the holder so that their leading cutting edges are disposed at predetermined small distances to a plane normal to the coal seam face and passing through the holder pivot axis, rather than forward of said plane, as in the prior art coal planers. With such a cutter mounting arrangement, the cutters can be positioned so as to increase the depth of cut into the coal seam floor by adjusting the angular position of the holder about its pivot axis, and without any substantial increase in the depth of cut into the coal seam face.

This basic improvement of the invention can be modified by including conventional means for displacing the cutters with respect to the holder pivot axis so as to position the cutter edges for obtaining a predetermined depth of cut into the coal seam floor without the disadvantage of a simultaneous increase in face cutting depth.

For greater flexibility in adapting to various coal deposit conditions, the aforesaid cutter displacement means can be made either stepwise or continuously variable in adjustment.

If desired, the cutter displacement means can be made so as to displace either the cutter holder or the cutters themselves in directions parallel to the holder pivot axis, or perpendicular to it and parallel to the coal seam face, or to effect such displacement in directions having components in each of the aforesaid directions.

It is therefore, an object of the invention to provide an improved coal planer of the hinge-mounted cutter holder type wherein the depth of cut into a coal seam floor can be adjustably controlled substantially independent of the cutting depth into the coal seam face.

Another object of the invention is to provide an improved coal planer as aforesaid, wherein the repulsion of the cutters by reaction forces and moments created by engagement with the face when the depth of cut into the floor is increased, is eliminated, or at least minimized.

Other and further objects and advantages of the invention will appear in or become evident from the following detailed description and accompanying drawings in which:

FIG. 1 is a front elevation view of a carriage member and hinge-mounted cutter holder of a coal planer constructed in accordance with a preferred embodiment of the invention, as seen from a coal seam face;

FIG. 2 is a plan view of the carriage member and cutter holder of FIG. 1.

Referring now to FIGS. 1 and 2 which illustrate the arrangement of a carriage member 2, cutter holder 4, and cutter 5 in a typical prior art coal planer, it can readily be seen that the cutter holder 4 is pivotally connected to the carriage member 2 by a hinge 3 arranged so that the pivot axis 1 of said hinge 3 lies in a plane parallel to the line of travel Z of said carriage member 2 which is movable back and forth over a guide member (not shown). The pivot axis 1 is also inclined at about an angle of 45 degrees with respect to the projection of the line Z upon said parallel plane through the axis 1.

In the typical operation of such a coal planer, the guide member (not shown) is positioned so that the line of travel Z is parallel to both the floor 11 and face 12 of a mining seam, such as for example, a coal mining seam with a horizontal floor 11 and vertical face 12, although it is not absolutely necessary that the floor 11 be horizontal and the face 12 be vertical. Also, the guide member (not shown) is positioned to provide a line of travel Z which permits the cutter 5 to engage the floor 11 and/or face 12 of the seam for removing coal fragments by cutting and/or scraping therefrom when the carriage 2 is moved in a forward direction with respect to the cutter 5 leading edge 6.

In certain prior art arrangements wherein the leading edge 6 was positioned a distance forward with respect to the forward end X of pivot axis 1, the floor 11 and face 12 were cut simultaneously with respective interdependent cutting depths which was a function of the angular position of the holder 4 about its pivot axis 1. The angular position of the holder 4 about the pivot axis 1 can be either fixedly or adjustably established by conventional means such as spindles, jacks, levers, buffers, etc. (not shown) so as to produce a predetermined depth of cut into either the floor 11 or face 12 and a correspondingly related depth of cut into the face 12 or floor 11 respectively.

This interdependence between the cutting depths into the floor 11 and face 12 is undesirable in that when the holder 4 is pivoted to obtain an increased depth of cut into the floor 11, the depth of cut into the face 12 is also increased. As a result, the reaction force from the face 12 which increases with depth of cut into said face 12, acts upon the cutter 5, and produces a moment acting upon the holder 4 via the lever arm distance from end point X which tends to swing the holder 4 so that the cutter 5 is out of engagement with the coal seam.

These disadvantages are overcome by the coal planer arrangement according to a preferred embodiment of the invention as shown by FIGS. 1 and 2. According to the invention, the cutter 5 is mounted on the holder so that its leading cutting edge 6 is disposed either in the plane passing through the forward end point X and perpendicular to the travel line Z (and hence perpendicular to the floor 11 and face 12) or else at a predetermined distance aft with respect to the forward end X of the holder 4 pivot axis 1, rather than forward of said end X as in the case of the prior art coal planer arrangement.

By reason of the cutter edge 6 location afforded by the invention, when the holder 4 is pivoted on axis 1 to place the edge 6 in the position a'', b'' and c'' which correspond to progressively increasing depths of cut into said floor 11, there is no substantial corresponding increase in the depth of cut into the face 12. Where the cutter edge 6 lies in the plane normal to the floor 11 and face 12 passing through the pivot end point X, the moment arm of the reaction force C from the face 12 is zero about the point X. Even if the edge 6 is located slightly aft of such normal plane, the reaction force C moment about point X will be less than in the case of the prior art cutter arrangement.

Although the aforesaid geometrical relationships between the pivot axis 1, the forward end X, and the edge 6 have been described in terms of planes parallel and normal to the line of travel Z, said relationships can also be expressed in terms of planes related to the floor 11 and face 12, as will be apparent to those skilled in the art. For example, the case of a horizontal floor 11 and vertical face 12 which are both parallel to the line of travel Z, the pivot axis 1 lies in a plane parallel to that of the face 12.

Similarly, the position of the edge 6 can be described with reference to a plane which is normal to the face 12 and passes through the forward end X of pivot axis 1, with said edge 6 in the arrangement according to the invention being disposed aft of said plane. (In FIGS. 1 and 2, the forward direction is to the left, and the aft direction is to the right, as along line Z.)

With the coal planer arrangement of the invention, the depth of cut into the floor 11 can be established by adjusting the angular position of the holder 4 about the pivot axis 1 by conventional means, but without the disadvantage of increasing the depth of cut into the face 12.

In the arrangement according to the instant invention, the positioning of the edge 6 can be accomplished by either stepwise or continuously variable adjustment means, or can be fixed.

Since, according to the invention, the position of edge 6 is aft with respect to the forward end X of the pivot axis 1, where adjustable means are used for displacing the cutter 5 to position its edge 6, this displacement can be performed in an aft direction along any suitable line, but preferably along a line either parallel to the pivot axis 1 or parallel to the line Z.

As will be apparent to those skilled in the art, the edge 6 can be positioned as aforesaid by either displacing the cutter 5 with respect to the holder 4, or by displacing the holder 4 with respect to the carriage 2, such as for example, by providing a sliding joint (not shown) between said holder 4 and hinge 3.

Other and further modifications and variations of the improved coal planer arrangement according to the invention as shown by way of example in FIGS. 1 and 2, can be used, since the invention is not necessarily limited to the particular embodiment shown therein.

What is claimed is:

1. A mining planer arrangement which comprises a carriage means disposed for movement back and forth along a path extending across the mine floor parallel to the mine face and situated in front thereof, a cutter holder pivotally connected to said carriage means for movement therewith, and a cutter supported by said cutter holder and having a leading edge positioned for extractive engagement with a selected portion of the mine face and mine floor to remove mineral therefrom as the carriage means moves along said path in a forward direction, said cutter holder being disposed for pivotal adjustment motion about an axis parallel to the mine face and inclined to the mine floor to correspondingly adjust the depth of extractive engagement therewith of said cutter leading edge, said leading edge and the forward termination of said pivot axis being within a common plane perpendicular to said mine face to allow pivoting of said cutter holder toward the mine floor to increase the depth of extractive engagement of said leading edge therewith without increasing the depth of extractive engagement of said leading edge into the mine face.

2. The mining planer arrangement according to claim 1 wherein said cutter holder pivot axis is inclined at an angle of approximately 45 degrees to said mine floor.

References Cited

FOREIGN PATENTS 859,464  1/1961  Great Britain.

ERNEST R. PURSER, *Primary Examiner.*